(12) United States Patent
Teles et al.

(10) Patent No.: US 6,958,304 B2
(45) Date of Patent: Oct. 25, 2005

(54) METHOD FOR REGENERATING A ZEOLITE CATALYST

(75) Inventors: Joaquim Henrique Teles, Otterstadt (DE); Alwin Rehfinger, Mutterstadt (DE); Peter Bassler, Viernheim (DE); Anne Wenzel, Eggenstein-Leopoldshafen (DE); Norbert Rieber, Mannheim (DE); Ulrich Müller, Neustadt (DE); Peter Rudolf, Ladenburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 76 days.

(21) Appl. No.: 10/380,070

(22) PCT Filed: Sep. 11, 2001

(86) PCT No.: PCT/EP01/10490

§ 371 (c)(1),
(2), (4) Date: Mar. 11, 2003

(87) PCT Pub. No.: WO02/22259

PCT Pub. Date: Mar. 21, 2002

(65) Prior Publication Data

US 2003/0187286 A1 Oct. 2, 2003

(30) Foreign Application Priority Data

Sep. 11, 2000 (DE) .......................... 100 44 798

(51) Int. Cl.⁷ .......................... B01J 38/04; B01J 20/34; B01J 38/14; B01J 29/04; C07D 301/12

(52) U.S. Cl. ............................ 502/34; 502/38; 502/52; 502/60; 502/85; 549/531; 549/532; 549/533; 549/538

(58) Field of Search .............................. 502/34, 38, 52, 502/60, 85; 549/531, 532, 533, 538

(56) References Cited

U.S. PATENT DOCUMENTS

| 6,031,116 A | | 2/2000 | Hartwell et al. ............. 549/523 |
| 6,106,797 A | * | 8/2000 | Muller et al. ................ 423/584 |
| 6,380,119 B1 | * | 4/2002 | Grosch et al. ................ 502/49 |

FOREIGN PATENT DOCUMENTS

| EP | 0 743 094 | 11/1996 |
| EP | 0 790 075 | 8/1997 |
| WO | WO 98/18555 | 5/1998 |
| WO | WO 98/18556 | 5/1998 |
| WO | WO 98/55228 | 12/1998 |

* cited by examiner

*Primary Examiner*—Stanley S. Silverman
*Assistant Examiner*—Jonas N. Strickland
(74) *Attorney, Agent, or Firm*—Oblon, Spivak, McClelland, Maier & Neustadt, P.C.

(57) ABSTRACT

A process for the regeneration of a zeolite catalyst which comprises treating the catalyst thermally in the presence of a gas stream at temperatures above 120° C., the weight-based residence time of the gas stream over the catalyst during the thermal treatment being greater than 2 hours.

Figure 1:
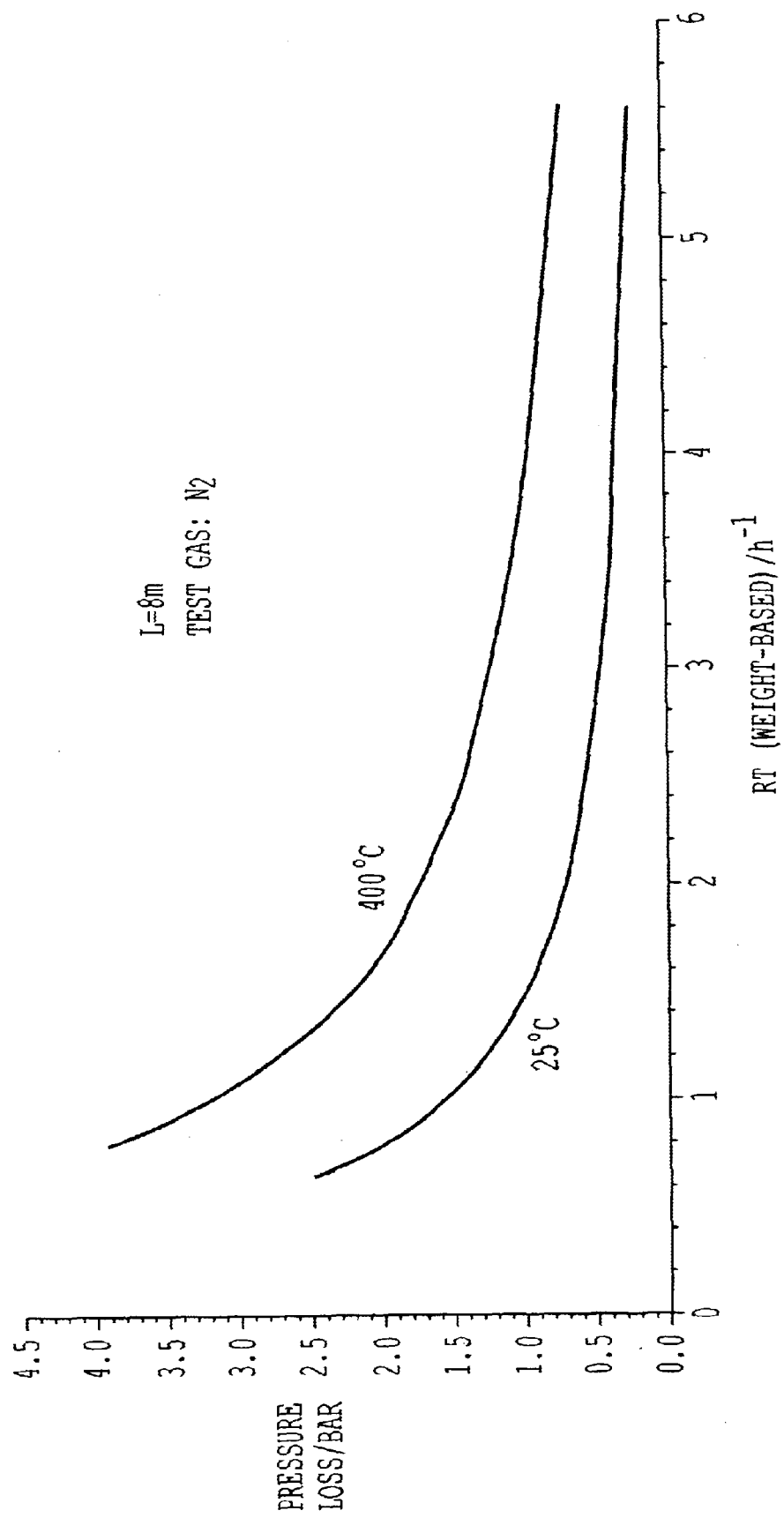

13 Claims, 3 Drawing Sheets they can have any desired cross section. The tubes are arranged
METHOD FOR REGENERATING A ZEOLITE CATALYST

CONTINUING APPLICATION DATA

This application is a 371 of international application No. PCT/EP01/10490, filed on Sep. 11, 2001.

The present invention relates to a process for the regeneration of a zeolite catalyst and to an integrated process for the preparation of an epoxide as part of which the regeneration according to the invention is carried out.

It is known from the prior art that the catalytic activity of heterogeneous catalysts for the oxidation of organic compounds in the liquid phase, where, in particular, the epoxidation of organic compounds having at least one C—C double bond using a hydroperoxide in the presence of a zeolite catalyst is of importance, decreases with advancing experiment time, and the corresponding catalysts then have to be regenerated.

Accordingly, processes for the regeneration of zeolite catalysts are already known from the prior art. In this respect, we refer to WO 98/55228 and the prior art cited therein. Within this prior art, basically two different procedures for catalyst regeneration are proposed.

1. If the catalyst is employed in suspension, it is firstly separated from the liquid reaction product and transferred into a regeneration device suitable for regeneration, where it is regenerated by thermal treatment in the presence of oxygen;
2. If the catalyst is employed as a fixed bed, the liquid phase is discharged or pumped off, and the catalyst is regenerated either in the reactor itself or in another regeneration device by thermal treatment in the presence of oxygen.

WO 98/18556 discloses a process for the regeneration of a titanium silicalite catalyst in which the catalyst is flushed with a gas stream at a temperature of at least 130° C. in such a way that the weight-based residence time of the gas stream over the catalyst is less than 2 hours.

In addition, regeneration by treatment of the catalyst with a liquid which is in turn an oxidant, for example hydrogen peroxide, at elevated temperature has already been described a number of times in the prior art. In this respect, we refer to DE-A 195 28 220 and WO 98/18555.

In view of this prior art, it is an object of the present invention to provide a further improved, in particular more effective process for the regeneration of zeolite catalysts which can readily be integrated into continuous and integrated processes for the preparation of epoxides of the type in question here, and which results, in particular, in the opening or re-closure of the reactors without long shutdown and down times. In particular, this process should be suitable for the regeneration of zeolite catalysts which are employed in an oxidation in the fixed-bed process.

In particular, it should be taken into account here that during the regeneration of a fixed bed, the pressure loss in the reactor is a very important parameter. Excessively high pressure losses can result in mechanical damage to the catalyst.

We have found that this and further objects are achieved by the process according to the invention for the regeneration of a zeolite catalyst.

The present invention accordingly relates to a process for the regeneration of a zeolite catalyst which comprises treating the catalyst thermally in the presence of a gas stream at temperatures above 120° C., the weight-based residence time of the gas stream over the catalyst during the thermal treatment being greater than 2 hours.

Figure 2:
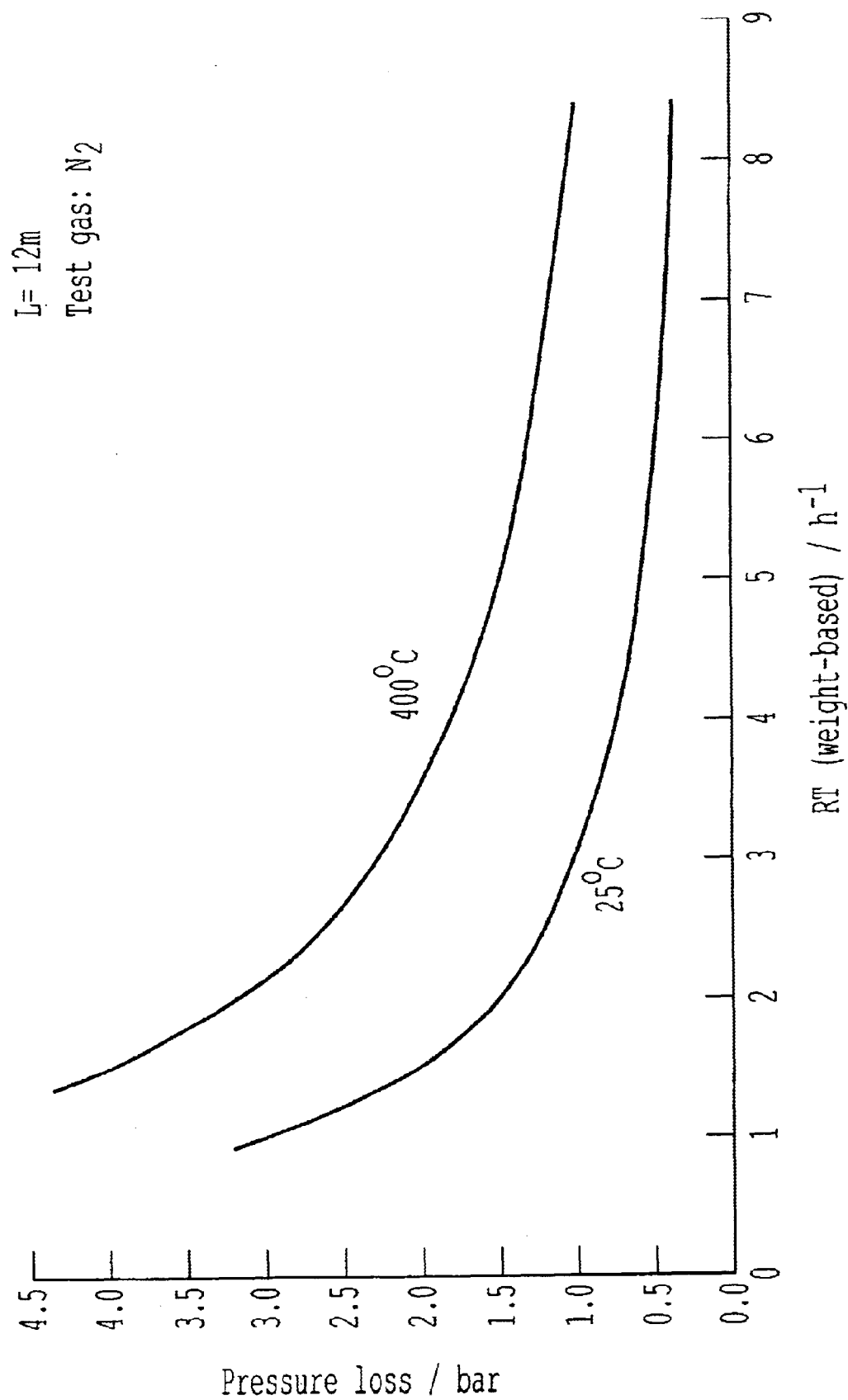

The following is a brief description of the figures of the present application:

FIG. 1: results obtained in Example 1 of the present application;
FIG. 2: results obtained in Example 2 of the present application; and
FIG. 3: results obtained in Example 3 of the present application.

The term "weight-based residence time" used in accordance with the invention denotes the ratio of the catalyst weight ($M_{cat}$) divided by the mass flow rate ($M_{gases}$) of the gases used in the regeneration.

The regeneration according to the invention is carried out in such a way that the weight-based residence time of the regeneration gas is greater than 2 hours, preferably from 3 to 10 hours and particular preferably from 4 to 6 hours.

The process is generally carried out in such a way that the pressure loss over the reactor is not greater than 4 bar, preferably not greater than 3 bar and in particular not greater than 2.5 bar.

In the process according to the invention, it is possible to regenerate both catalysts in powder form, which are used as a suspension, and also catalysts packed in a fixed bed in the form of moldings, for example as pellets or extrudates, and on meshes, for example stainless steel, kanthal, or packings of crystallized catalysts and coated catalysts consisting of an inert core of $SiO_2$, $\alpha$-$Al_2O_3$, highly calcined $TiO_2$ or steatite and an active catalyst shell comprising a zeolite.

If the catalyst has been used in the suspension process, it must first be separated from the reaction solution by a separation step, for example filtration or centrifugation. The at least partially deactivated, pulverulent catalyst obtained in this way can then be fed to regeneration. The steps carried out at elevated temperature during the regeneration process are preferably carried out in revolving tubular furnaces in the case of pulverulent catalysts of this type. In the regeneration of a catalyst used in the suspension process, it is particularly preferred for some of the at least partially deactivated catalyst to be removed continuously as part of coupling of the reaction in the suspension process and the regeneration process according to the invention, and regenerated externally by means of the process according to the invention, and for the regenerated catalyst to be fed back into the reaction in the suspension process.

Besides the regeneration of catalysts in powder form, the process according to the invention can also be used for the regeneration of catalysts as moldings, for example those packed in a fixed bed. In the regeneration of a catalyst packed in a fixed bed, the regeneration is preferably carried out in the reaction apparatus itself; to do this, there is no need to remove or install the catalyst, and consequently there is no additional mechanical loading at all. In the regeneration of the catalyst in the reaction apparatus itself, the reaction is firstly interrupted, any reaction mixture present is removed, the regeneration is carried out, and the reaction is then continued.

The regeneration according to the invention proceeds in an essentially identical manner both in the regeneration of pulverulent catalysts and in the regeneration of catalysts in shaped form.

However, the regeneration process according to the invention is particularly suitable for regeneration in a fixed-bed reactor, in particular in a tubular reactor or tube-bundle reactor. The terms "tubular reactor" and "tube-bundle reactor" here describe combined parallel arrangements of a multiplicity of channels in the form of tubes, where the tubes can have any desired cross section. The tubes are arranged in a fixed spatial relationship to one another, are preferably spatially separated from one another and are preferably surrounded by a jacket which covers all tubes. This enables, for example, a heating or cooling medium to be passed through the jacket, so that the temperature of all tubes is controlled uniformly.

The individual tubes within the tubular or tube-bundle reactor preferably used furthermore preferably have a length of from approximately 0.5 to 15 m, further preferably from 5 to 15 m and in particular from approximately 8 to 12 m.

The catalyst should preferably remain in the reactor during the regeneration. Furthermore, the regeneration process according to the invention can also be used for zeolite catalysts used in a plurality of reactors connected in parallel or in series or (in some cases) in parallel and in series.

The regeneration according to the invention is carried out at temperatures above 120° C., preferably above 350° C. and in particular at from 400° C. to 650° C.

There are in principle no restrictions regarding the regeneration gases used so long as the regeneration can be carried out in such a way that the catalyst in the interior of the reactor does not heat up, for example due to burn-off of the organic coatings thereon, in such a way that the pore structure thereof and/or the reactor itself is damaged. The regeneration is preferably carried out in such a way that a hot-spot which forms a temperature increase of from 10 to 30° C., preferably not more than 20° C., forms within the catalyst bed.

Accordingly, suitable regeneration gases are oxygen-containing regeneration gases, for example air, and gases which are essentially free from oxygen, oxygen-supplying compounds and other oxidizing constituents. If the regeneration gas comprises oxygen, its proportion in the regeneration gas is preferably less than 20% by volume, further preferably from 0.1 to 10% by volume, in particular from 0.1 to 5% by volume and still further preferably from 0.1 to 2% by volume of oxygen. Preference is given to a mixture of air and corresponding volumes of nitrogen.

The term "oxygen-supplying substances" used above covers all substances which are capable of releasing oxygen or removing carbon-containing residues under the stated regeneration conditions. Particular mention should be made of the following:

Nitrogen oxides of the formula $N_xO_y$, where x and y are selected so as to give a neutral nitrogen oxide, $N_2O$, $N_2O$-containing offgas stream from an adipic acid plant, NO, $NO_2$, ozone, CO, $CO_2$ or a mixture of two or more thereof. On use of carbon dioxide as oxygen-supplying substance, the regeneration is carried out at a temperature in the range from 500° C. to 800° C.

There are no particular restrictions regarding the zeolite catalysts regenerated in the course of the present process.

As is known, zeolites are crystalline aluminosilicates having ordered channel and cage structures which have micropores which are preferably less than approximately 0.9 nm. The network of such zeolites is built up from $SiO_4$ and $AlO_4$ tetrahedra, which are linked via common oxygen bridges. An overview of the known structures is given, for example, in W. M. Meier, D. H. Olson and Ch. Baerlocher, "Atlas of Zeolite Structure Types", Elsevier, 4$^{th}$ Edn., London, 1996.

Zeolites are also known which contain no aluminum and in which some of the Si(IV) in the silicate lattice has been replaced by titanium in the form of Ti(IV). These titanium zeolites, in particular those having a crystal structure of the MFI type, and methods for their preparation are described, for example, in EP-A 0 311 983 and EP-A 405 978. In addition to silicon and titanium, such materials may also contain additional elements, for example aluminum, zirconium, tin, iron, cobalt, nickel, gallium, boron or small amounts of fluorine. In the zeolite catalysts preferably regenerated by means of the process according to the invention, some or all of the titanium of the zeolite may have been replaced by vanadium, zirconium, chromium or niobium or a mixture of two or more thereof. The molar ratio between titanium and/or vanadium, zirconium, chromium or niobium to the total of silicon and titanium and/or vanadium and/or zirconium and/or chromium and/or niobium is generally in the range from 0.01:1 to 0.1:1.

Titanium zeolites, in particular those having a crystal structure of the MFI type, and methods for their preparation are described, for example, in WO 98/55228, WO 98/03394, WO 98/03395, EP-A 0 311 983 and EP-A 0 405 978, which are expressly incorporated into the present invention by way of reference in their full scope in this respect.

Titanium zeolites having an MFI structure are known for the fact that they can be identified via a certain pattern in the determination of their X-ray diffraction diagrams and in addition via a skeletal vibration band in the infrared region (IR) at about 960 cm$^{-1}$ and thus differ from alkali metal titanates or crystalline or amorphous $TiO_2$ phases.

Suitable here are, in detail, titanium-, germanium-, tellurium-, vanadium-, chromium-, niobium- and zirconium-containing zeolites having a pentasil zeolite structure, in particular the types with X-ray assignment to the ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WEI, WEN, YUG or ZON structure and to mixed structures consisting of two or more of the above-mentioned structures. Also feasible for use in the process according to the invention are titanium-containing zeolites having the ITQ-4, SSZ-24, TTM-1, UTD-1, CIT-1 or CIT-5 structure. Further titanium-containing zeolites which may be mentioned are those having the ZSM-48 or ZSM-12 structure.

Ti zeolites having the MFI, MEL or MFI/MEL mixed structure are regarded as particularly preferred for the process according to the invention. Preference is furthermore given, in detail, to the Ti-containing zeolite catalysts generally known as "TS-1", "TS-2" and "TS-3", and Ti zeolites having a skeletal structure which is isomorphous with β-zeolites.

Accordingly, the present invention also relates to a process as described above wherein the catalyst is a titanium silicalite of the structure TS-1.

The term "alkene" as used for the purposes of the present invention is taken to mean all compounds which have at least one C—C double bond.

The following alkenes may be mentioned as examples of such organic compounds having at least one C—C double bond:

Ethene, propene, 1-butene, 2-butene, isobutene, butadiene, pentenes, piperylene, hexenes, hexadienes, heptenes, octenes, diisobutene, trimethylpentene, nonenes, dodecene, tridecene, tetra- to eicosenes, tri- and tetrapropene, polybutadienes, polyisobutenes, isoprenes, terpenes, geraniol, linalool, linalyl acetate, methylenecyclopropane, cyclopentene, cyclohexene, norbornene, cycloheptene, vinylcyclohexane, vinyloxirane, vinylcyclohexene, styrene, cyclooctene, cyclooctadiene, vinylnorbornene, indene, tetrahydroindene, methylstyrene, dicyclopentadiene, divinylbenzene, cyclododecene, cyclododecatriene, stilbene, diphenylbutadiene, vitamin A, beta-carotene, vinylidene fluoride, allyl halides, crotyl chloride, methallyl chloride, dichlorobutene, allyl alcohol, methallyl alcohol, butenols, butenediols, cyclopentenediols, pentenols, octadienols, tridecenols, unsaturated steroids, ethoxyethene, isoeugenol, anethol, unsaturated carboxylic acids, for example acrylic acid, methacrylic acid, crotonic acid, maleic acid and vinylacetic acid, unsaturated fatty acids, for example oleic acid, linoleic acid and palmitic acid, and naturally occurring fats and oils.

In the process according to the invention, preference is given to alkenes which contain 2 to 8 carbon atoms. Particular preference is given to ethene, propene and butene. Especial preference is given to propene.

Accordingly, the present invention also relates to a process as described above or to an integrated process as described above wherein the alkene is propene.

The term "hydroperoxide" covers all hydroperoxides including hydrogen peroxide, reference being made to the prior art with respect to the hydroperoxide solutions which can be used for the purposes of the process according to the invention and their preparation. To this end, we refer by way of example to DE 197 23 950.1 and the prior art cited therein.

For the preparation of the hydrogen peroxide used, recourse can be made, for example, to the anthraquinone process, by which virtually all the hydrogen peroxide produced worldwide is prepared. This process is based on the catalytic hydrogenation of an anthraquinone compound to give the corresponding anthrahydroquinone compound, subsequent reaction thereof with oxygen to form hydrogen peroxide, and subsequent removal of the resultant hydrogen peroxide by extraction. The catalysis cycle is closed by re-hydrogenation of the reformed anthraquinone compound.

An overview of the anthraquinone process is given in "Ullmann's Encyclopedia of Industrial Chemistry", 5$^{th}$ Edition, Volume 13, pages 447 to 456.

It is likewise conceivable to obtain hydrogen peroxide by converting sulfuric acid into peroxodisulfuric acid by anodic oxidation with simultaneous cathodic evolution of hydrogen. The hydrolysis of the peroxodisulfuric acid via peroxosulfuric acid then gives hydrogen peroxide and sulfuric acid, which is thus recovered. It is of course also possible to prepare hydrogen peroxide from the elements.

Before use of hydrogen peroxide in the process according to the invention, it is possible, for example, to free a commercially available hydrogen peroxide solution from undesired ions. Conceivable methods here are, inter alia, those as described, for example, in WO 98/54086, DE-A 42 22 109 and WO 92/06918. It is likewise possible for at least one salt present in the hydrogen peroxide solution to be removed from the hydrogen peroxide solution by ion exchange by means of an apparatus which contains at least one non-acidic ion exchanger bed having a flow cross-sectional area A and a depth D, where the depth D of the ion exchanger bed is less than or equal to $2.5 \cdot A^{1/2}$ and in particular less than or equal to $1.5 \cdot A^{1/2}$. For the purposes of the present invention, it is in principle possible to employ any non-acidic ion exchanger beds containing cation exchangers and/or anion exchangers. Cation and anion exchangers can also be used as so-called mixed beds within a single ion exchanger bed. In a preferred embodiment of the present invention, only one type of non-acidic ion exchanger is employed. The use of basic ion exchange, particularly preferably that of a basic ion exchanger and further particularly preferably that of a weakly basic anion exchanger, is furthermore preferred.

In a particularly preferred embodiment, the present invention relates to a process for the regeneration of a zeolite catalyst which comprises the following steps (1) to (4):

(1) washing the zeolite catalyst with a solvent (2) drying the washed zeolite catalyst at a temperature of from −50 to 250° C.

(3) heating the dried catalyst (4) regeneration the heated catalyst by means of a process according to the present invention.

This preferred regeneration process furthermore preferably comprises the further steps (5) and/or (6):

(5) cooling the regenerated catalyst obtained in step (4)

(6) conditioning the catalyst obtained in step (4) or in step (5).

These steps are now described again individually in detail. It should first be noted that the zeolite catalyst to be regenerated is generally a catalyst which is employed in the oxidation of an alkene by reaction of the alkene with a hydroperoxide, preferably a reaction which has been carried out continuously, and as a consequence of a drop in activity now has to be regenerated. As already indicated above, the regeneration according to the invention is preferably carried out in the reactor(s) in which the reaction of the alkene with a hydroperoxide in the presence of the catalyst to be regenerated is also carried out.

In a further, very particularly preferred embodiment, the reactor is operated as an integrated system with the work-up of the target product and the regeneration according to the invention, since this procedure allows a closed loop of solvent.

(1) Washing the Zeolite Catalyst With a Solvent

The first step in this embodiment of the regeneration according to the invention firstly comprises washing the deactivated catalyst with a solvent. For this purpose, firstly the supply of the starting materials of hydroperoxide and organic compound is interrupted. Solvents which can be employed here are all solvents in which the respective reaction product of the oxidation of the alkene is readily soluble. Preference is given to solvents of this type selected from the group consisting of water, an alcohol, preferably methanol, an aldehyde, an acid, for example formic acid, acetic acid or propionic acid, a nitrile, a hydrocarbon and a halogenated hydrocarbon. For details on solvents of this type, reference is made to WO 98/55228, which is expressly incorporated into the present invention by way of reference in its full scope in this respect.

Preference is given to solvents which are already employed in the reaction, i.e., for example, function as solvent in the epoxidation of olefin using the catalyst to be regenerated. Mention may be made by way of example as such for the epoxidation of olefins of the following: water, alcohols, for example methanol, ethanol, 1-propanol, 2-propanol, 2-methyl-2-propanol, 1-butanol, 2-butanol, allyl alcohol or ethylene glycol, or ketones, for example acetone, 2-butanone, 2-methyl-3-butanone, 2-pentanone, 3-pentanone, 2-methyl-4-pentanone or cyclohexanone.

If the solvent employed for the washing is the solvent already used in the reaction, its feed is continued, and the catalyst is washed with the solvent at a temperature of, in general, from 40 to 200° C., if desired with increasing temperature and under pressure. The washing is preferably continued until the content of reaction product in the discharge drops to less than 1% of the initial value. If another solvent is to be used, the feed of hydroperoxide, the reaction product and the solvent in the reaction is interrupted, and the feed of the solvent for washing is started. Particular preference is given to the use of the same solvent for the reaction and for the washing of the catalyst.

There are no restrictions at all regarding the duration of the washing process, relatively long washing times and thus very substantial removal of the reaction product or the organic coatings being advantageous.

(2) Drying of the Washed Zeolite Catalyst at a Temperature of from −50 to 250° C.

After the washing of the catalyst, the solvent used is discharged or pumped out of the reactor. The porous catalyst then still contains considerable amounts of adhering solvent, which is substantially removed by drying with a gas stream at temperatures of from −50 to 250° C., the temperature used being in the vicinity of the boiling point of the solvent at the pressure desired in each case. The temperatures are typically in the region of ±50° C. above or below the boiling point.

The drying is generally carried out using an inert gas, for example nitrogen, argon, $CO_2$, hydrogen, synthesis gas, methane, ethane or natural gas. Preference is given to nitrogen. The solvent-charged gas is then either disposed of, for example by incineration using a flare, or fed in at a suitable point, for example during work-up of the reaction product from the process for the oxidation of an alkane, and the solvent present therein is recovered.

In a preferred embodiment, the washing is carried out under pressure at a temperature above the boiling point of the solvent and, after the solvent has been discharged, the pressure is reduced to such an extent that some of the solvent already evaporates due to the latent heat of the reactor even before or during the supply of gas for the drying.

For the supply of heat within this step, either a gas or a liquid can be employed, for example within the jacket of a tubular reactor. Preference is given to the use of a liquid for the temperature range below 150° C. and to a gas for the temperature range above 150° C.

(3) Heating of the Dried Catalyst

After the drying, the catalyst to be regenerated is heated. This heating can be carried out by any methods familiar to the person skilled in the art, the heating preferably being carried out in the presence of a stream of inert gas, for example nitrogen, argon, methane, ethane or natural gas.

In a preferred embodiment of the process according to the invention, the catalyst is located in the tubes of a tube-bundle reactor. In reactors of this type, the heat is introduced into the system through the jacket space. The heating rate here must be selected so that inadmissibly high mechanical stresses do not arise in the reactor. Typical heating rates are from 0.01° C./min to 0.2° C./min.

(4) Regeneration of the Heated Catalyst by Means of a Process According to the Present Invention The regeneration of the catalyst is subsequently carried out as described in detail in the present application.

(5) Cooling of the Regenerated Catalyst Obtained in Step (4)

After completion of the regeneration in step (4), the regenerated catalyst, preferably the entire reactor with the regenerated catalyst located therein, can be cooled to a temperature of preferably below 200° C.

(6) Conditioning of the Catalyst Obtained in Step (4) or Step (5)

After the regeneration according to the invention or the cooling, the catalyst can also be conditioned in order to dissipate the heat of sorption of the solvent or starting materials in a controlled manner before re-use of the catalyst. To this end, small amounts of a solvent, preferably the same solvent which has been employed for the reaction or for the washing of the catalyst, in particular an alcohol, for example methanol, are admixed with the inert gas flowing past the catalyst, and the solvent vapor-containing stream of inert gas is passed through the catalyst bed. The solvent content and the volume flow rate of the conditioning gas are selected so that an inadmissible peak temperature of the catalyst does not occur. The temperature increase should preferably be not greater than 100° C. above the mean temperature of the heat transfer medium, for example in a jacket space of a tubular reactor.

After the heat liberation has subsided, the feed of conditioning gas containing solvent is interrupted, and the reactor, preferably the fixed-bed reactor, is filled with liquid and put back into operation.

In the optional steps (5) and (6) of the process according to the invention, it is important that both the cooling is not carried out too quickly and that the conditioning is not carried out too quickly, since both processes can have adverse effects on the catalyst bed in the reactor. In addition, an excessively fast temperature increase within the catalyst during conditioning should also be avoided for the same reasons.

The regenerated catalyst is preferably, as indicated above, re-employed for the reaction of the alkene with the hydroperoxide. In particular, the regeneration according to the invention or the integrated process for the oxidation of an alkene can be used for the conversion of propylene into propylene oxide by means of hydrogen peroxide, further preferably in methanol solution.

The process according to the invention has, in particular, the following advantages:

the gentle way in which the reaction is carried out means that zeolite catalysts can be regenerated in such a way that the activity after regeneration is substantially retained;

the regeneration process according to the invention can, on use of a fixed-bed catalyst, be carried out in the reactor itself without removal of the catalyst;

the solvents employed in the regeneration process according to the invention may be identical with the solvents during the reaction and overall be circulated completely.

The invention will now be explained in greater detail with reference to some examples according to the invention.

EXAMPLES

Example 1

A TS-1 catalyst (in the form of 1.5 mm pellets) was introduced to a bed depth of 8 m (in total 4480 g of catalyst)

into a tube with a length of 1.25 m open at the top and with electrical secondary heating. By means of a calibrated mass flow meter, various mass flow rates of nitrogen were passed through the reactor at room temperature and at 400° C., and the corresponding pressure loss over the bed depth measured. The results are shown in FIG. 1 as pressure loss vs. mass-based residence time. It can be seen that for mass-based residence times of less than 2 hours, the pressure loss increases rapidly, in particular at the higher temperatures which are generally necessary for regeneration.

Example 2

The preceding example was repeated with a bed depth of 12 m. The reactor then contained in total 6720 g of catalyst. The results are shown in FIG. 2 as pressure loss vs. weight-based residence time. It can be seen that for weight-based residence times of the less than 2 hours, the pressure loss increases rapidly and, as expected, to an even greater extent than in Example 1.

Example 3

Figure 3:
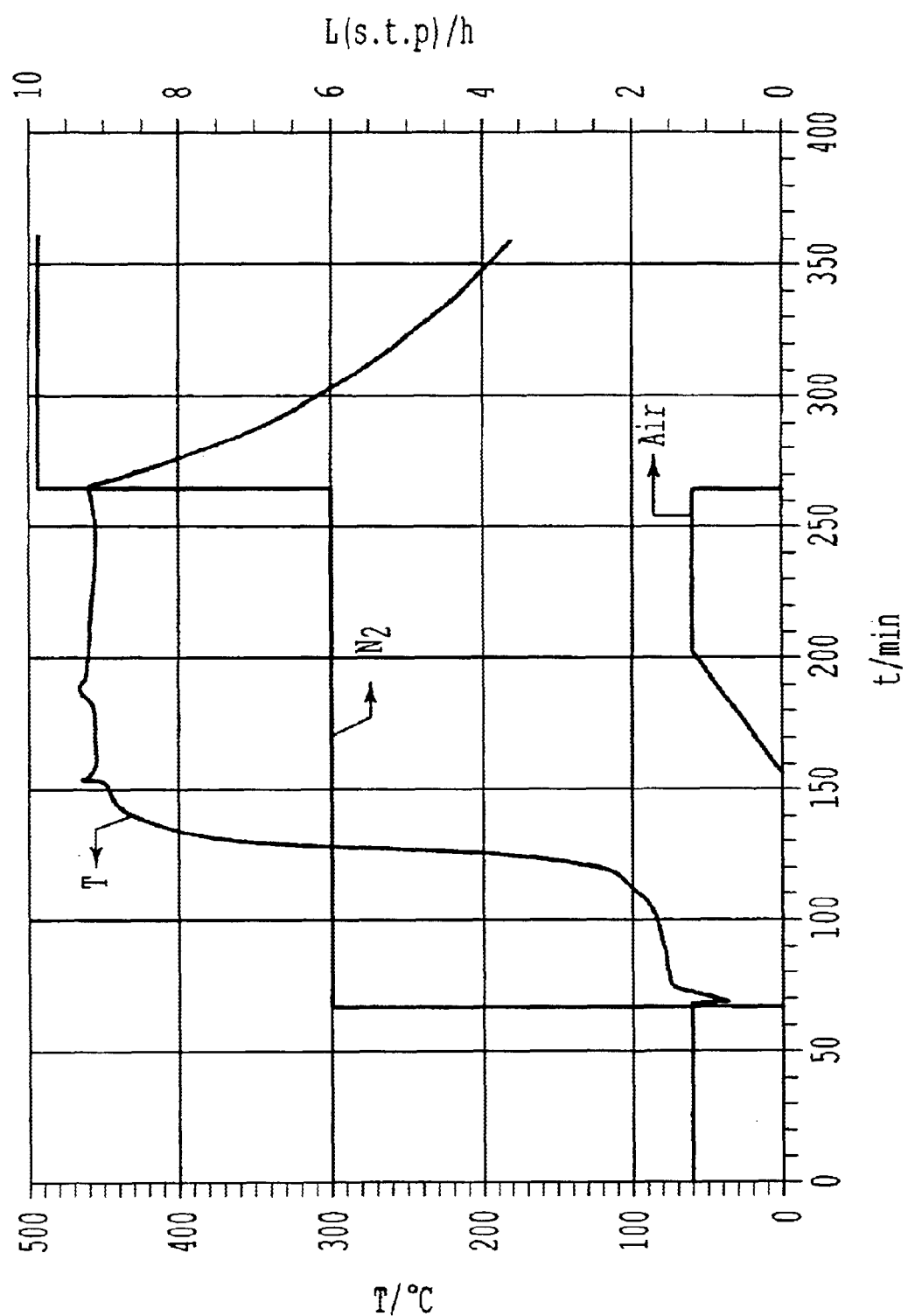

40 g of a spent TS-1 catalyst (removed after an operating time of about 600 hours) in the form of pellets with a diameter of 1.5 mm were introduced into an electrically heated stainless-steel tube having an internal diameter of 25 mm and a length of 200 mm. After drying at 50° C. in a stream of nitrogen, this removed catalyst contained 1.0% by weight of carbon. For monitoring the internal temperature, a thermocouple was mounted in the center of the catalyst bed. 61 (s.t.p.)/h of nitrogen were passed through this bed. The heating was then switched on, and the temperature increased to 450° C. over the course of 84 minutes. When the temperature was reached, air was slowly metered in (from 0 to a maximum of 11 (s.t.p.)/h over the course of 50 minutes). The regeneration was subsequently carried out with 61 (s.t.p.)/h of nitrogen and 1 (st.p.)/h of air 1 hour at 450° C. The weight-based residence time of the regeneration gas, defined as indicated in the description, was 5.3 hours before and 4.6 hours after the stream of air was switched on. The heating was subsequently switched off and, in order to accelerate cooling, the stream of nitrogen increased to 101 (s.t.p.)/h. The change in temperature and the amounts of nitrogen and air employed are shown in FIG. 3.

The maximum temperature peak observed was 10° C. (at 157 and 191 min). After cooling, the catalyst was removed and analyzed. The carbon content was <0.1% by weight. The regenerated catalyst exhibited the same activity and selectivity in the epoxidation of propene using hydrogen peroxide in methanol as did the fresh catalyst.

Example 4

800 g of a spent TS-1 catalyst (removed after an operating time of about 1000 hours) in the form of pellets having a diameter of 1.5 mm were introduced into an electrically heated stainless-steel tube having an internal diameter of 40 mm and a length of 2100 mm. After drying at 50° C. in a stream of nitrogen, this removed catalyst contains 1.2% by weight of carbon. In order to monitor the internal temperature, the tube was fitted with thermocouples at separations of about 200 mm. A gaseous stream composed of 100 l (s.t.p.)/h of nitrogen and 30 l (s.t.p.)/h of air (corresponds to 130 l (s.t.p.)/h with 4.6% by volume of oxygen in nitrogen) was passed through this bed. The weight-based residence time of the regeneration gas, defined as indicated in the description, was 4.9 hours. The pressure loss over the bed was about 20 mbar. The heating was subsequently switched on and the temperature increased to 400° C. over the course of 2 hours. The pressure loss over the bed increased about 20 mbar. The temperature was then held at 400° C. for a further 8 hours. The maximum temperature observed within the bed (hot spot) was only 425° C. After cooling, the catalyst was removed and analyzed. The carbon content was <0.1% by weight. The regenerated catalyst exhibited the same activity and selectivity in the epoxidation of propene using hydrogen peroxide in methanol as did a fresh catalyst.

What is claimed is:

1. A process for the regeneration of a zeolite catalyst, comprising:
    treating the catalyst thermally in a fixed-bed reactor in the presence of a gas stream at temperatures above 120° C., wherein the weight-based residence time of the gas stream over the catalyst during the thermal treatment is from 4 to 6 hours,
    wherein the fixed-bed reactor is a tubular reactor or a tube-bundle reactor.

2. A process as claimed in claim 1, where the zeolite catalyst is a titanium silicalite having the TS-1 structure.

3. A process as claimed in claim 1, where the regeneration gas comprises from 0.1 to 10% by volume of oxygen.

4. A process as claimed in claim 1, which comprises:
    (1) washing the zeolite catalyst with a solvent,
    (2) drying the washed zeolite catalyst at a temperature of from −50 to 250° C.,
    (3) heating the dried catalyst, and
    (4) regenerating the heated catalyst as described in claim 1.

5. A process as claimed in claim 4, which further comprises at least one of the following (5) and (6), which are carried out after (4):
    (5) cooling the regenerated catalyst obtained in (4),
    (6) conditioning the catalyst obtained in (4) or in (5) wherein, for conditioning, small amounts of a solvent are admixed to an inert conditioning gas stream passing the catalyst and the inert conditioning gas stream containing solvent is passed through the catalyst bed.

6. An integrated process for the oxidation of an alkene, comprising:
    reacting the alkene with a hydroperoxide in the presence of a zeolite catalyst, and subsequently,
    regenerating the catalyst by means of a process as described in claim 1.

7. A process as claimed in claim 6, wherein the alkene is propene and the hydroperoxide is hydrogen peroxide.

8. A process as claimed in claim 6, where the regenerated catalyst is re-employed for the reaction of the alkene with the hydroperoxide.

9. A process as claimed in claim 8, where the alkene is propene and the hydroperoxide is hydrogen peroxide.

10. A process for the regeneration of a zeolite catalyst, comprising:
    treating the catalyst thermally in a fixed-bed reactor in the presence of a gas stream at temperatures above 120° C., wherein the weight-based residence time of the gas stream over the catalyst during the thermal treatment is from 3 to 10 hours.

11. An integrated process for the oxidation of an alkene, comprising:
    reacting the alkene with a hydroperoxide in the presence of a zeolite catalyst and subsequently
    treating the catalyst thermally in a fixed-bed reactor in the presence of a gas stream at temperatures above 120° C., wherein the weight-based residence time of the gas stream over the catalyst during the thermal treatment is from 4 to 6 hours, to regenerate the catalyst, wherein the fixed-bed reactor is a tubular reactor or a tube-bundle reactor.

12. The integrated process as claimed in claim 11, wherein the regenerated catalyst is re-employed for the reaction of the alkene with the hydroperoxide, and wherein the alkene is propene and the hydroperoxide is hydrogen peroxide.

13. An integrated process as claimed in claim 11, wherein the pressure loss over the reactor in which the catalyst is regenerated is not greater than 4 bar.

* * * * *